United States Patent [19]

Garrett

[11] 4,116,044

[45] Sep. 26, 1978

[54] PACKOFF LEAK DETECTOR

[75] Inventor: Michael R. Garrett, Spring, Tex.

[73] Assignee: FMC Corporation, San Jose, Calif.

[21] Appl. No.: 792,083

[22] Filed: Apr. 28, 1977

[51] Int. Cl.² ............................................. G01M 3/28
[52] U.S. Cl. .................... 73/40.5 R; 285/93; 340/605
[58] Field of Search ..................... 73/46, 40.5; 285/93; 340/242

[56] References Cited

U.S. PATENT DOCUMENTS

| 2,478,628 | 8/1949 | Hansen | 73/46 |
| 2,951,363 | 9/1960 | Diodene | 73/40.5 R |
| 3,872,713 | 3/1975 | Ilfrey | 73/46 |
| 3,974,690 | 8/1976 | Brock et al. | 73/40.5 R |

Primary Examiner—S. Clement Swisher
Attorney, Agent, or Firm—L. B. Guernsey; W. W. Ritt, Jr.

[57] ABSTRACT

Packoff leaks in an unaccessible wellhead are monitored by a first pressure-sensitive detector positioned below the packoff seal. The space above the packoff seal is isolated from the inner bore of the casing, and fluid under pressure is applied above the seal to create a pressure differential across it. Any leakage through the seal is detected by a rise in pressure at the first detector. A second detector, coupled to the space above the seal, monitors the pressure above the seal.

9 Claims, 2 Drawing Figures

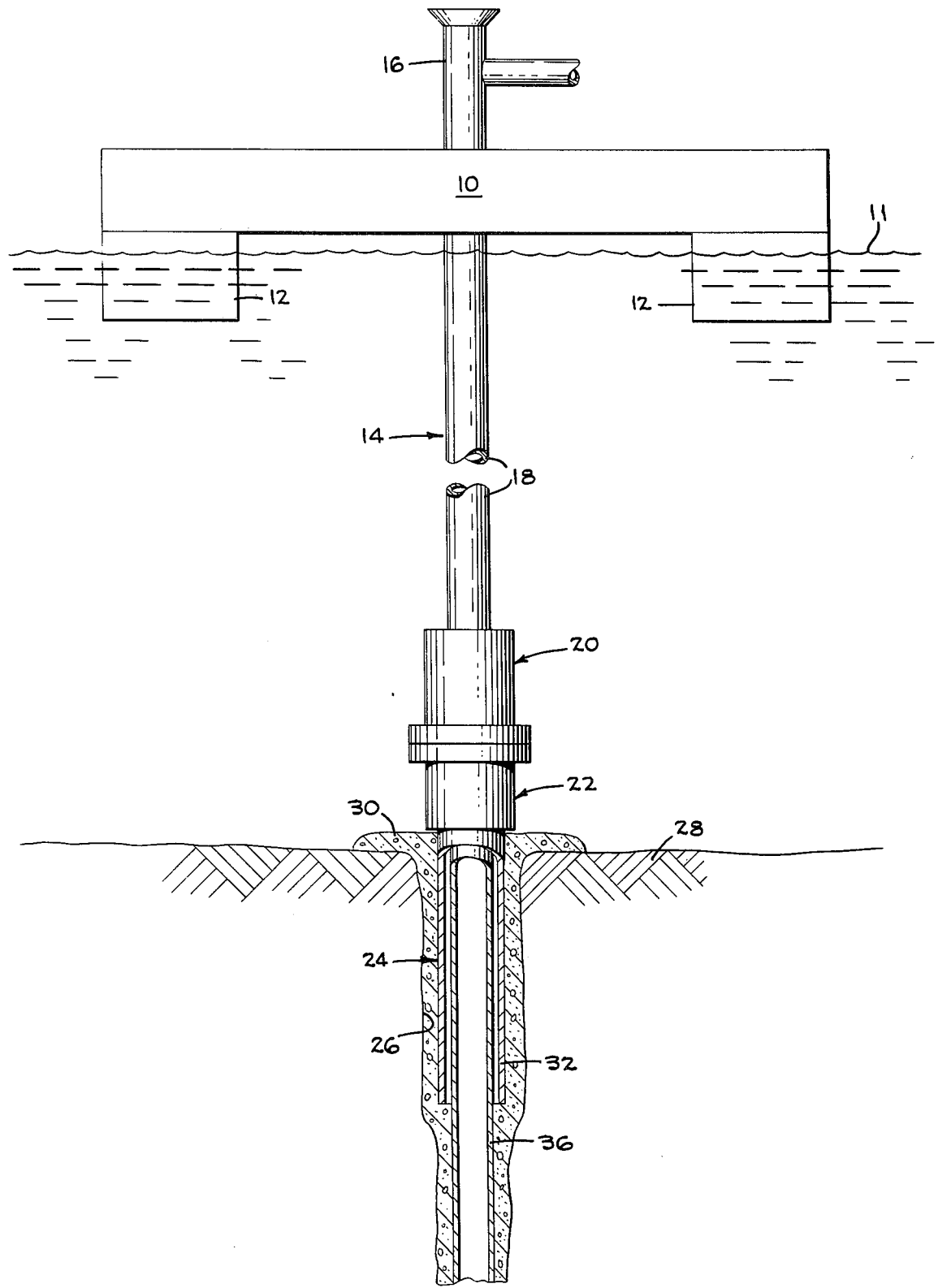
FIG_1

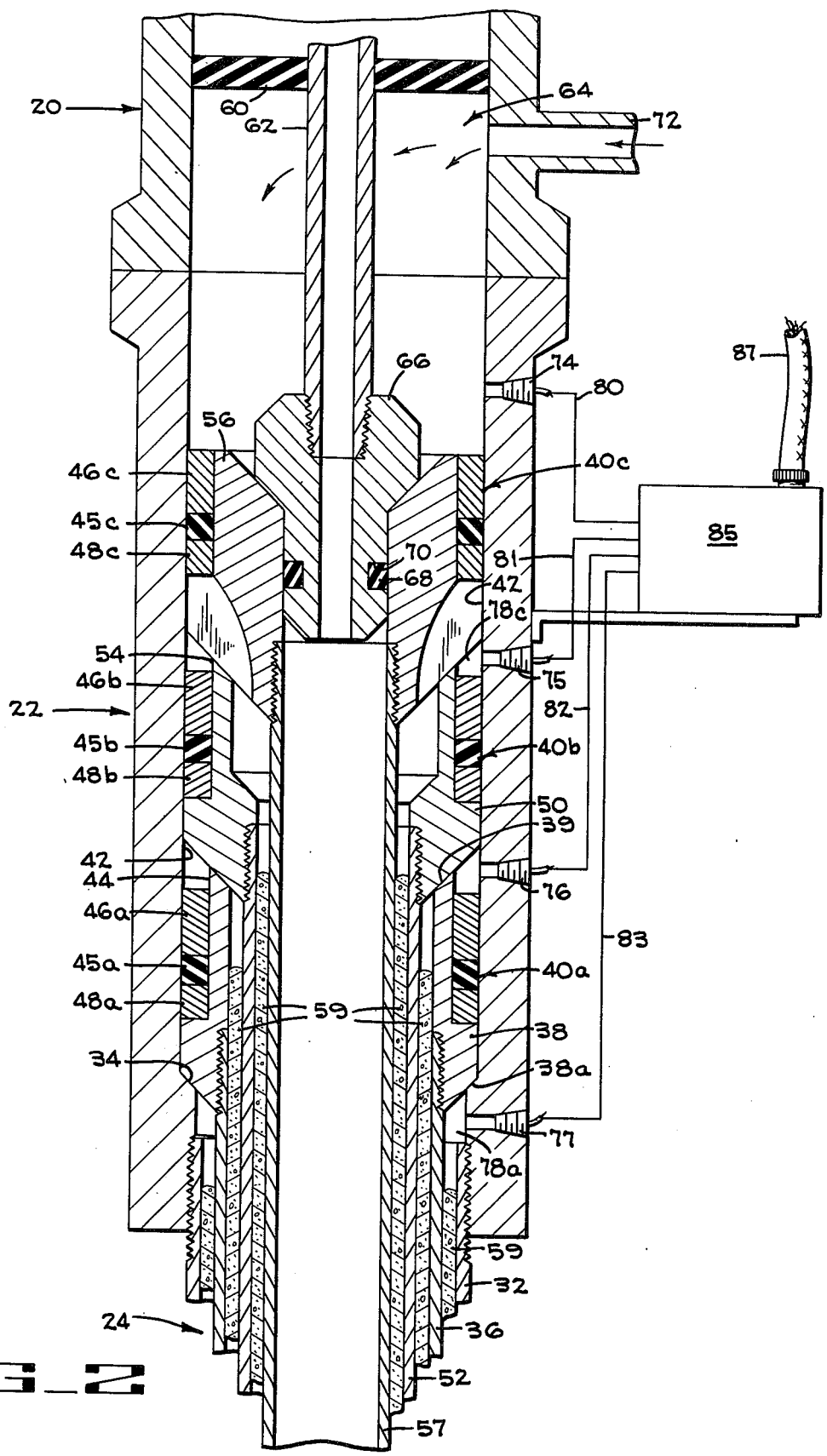
FIG_2

PACKOFF LEAK DETECTOR

BACKGROUND OF THE INVENTION

1. Field of the Invention

The present invention pertains to apparatus for detecting leaks in an annular ring, and more particularly to apparatus for detecting leaks in a packoff seal positioned between an oil or gas wellhead and an inner tubular member which is suspended from the wellhead.

2. Description of the Prior Art

Crude oil and natural gas wells drilled offshore often have their wellheads positioned on the ocean floor. The wellhead is normally installed by mounting it on the upper end of a string of casing which is lowered into the bore hole and cemented in place. The wellhead is generally in the shape of a cylinder having a bowl-shaped bore which is adapted to sealably support an inner concentric string of casing and a casing hanger that is affixed to the upper end of the inner casing string prior to lowering the string and seating the hanger within the bowl of the wellhead. The casing hanger has an enlarged diameter, and is adapted to be received and supported within the bowl of the wellhead. The casing hanger is provided with a packoff element around its outer periphery to provide a pressure tight seal between the outside of the casing and the inside of the wellhead. The casing hanger also has a bowl shaped inner bore similar to that of the wellhead, and is adapted to support the next string of pipe or casing. In this fashion, a nest of casing hangers may be supported one atop the other within a wellhead, with each of the casing hangers serving to suspend a successively smaller concentric string of casing.

In many present day well completion systems annular packoff seal elements are positioned between the wellhead and each casing hanger to provide a pressure-tight seal therebetween. It is important that gas, water and other fluids which may be forced into some of the outer casings be prevented from moving into the inner casings, and that fluids from the inner casing be prevented from moving into the outer casings. Each of the packoff seals must be designed to withstand the maximum well pressure since pressure abnormalities are controlled by closing the blowout preventers situated above the wellhead, and this will cause high pressure to be exerted across the various seals. It is, therefore, important to test each of the packoff seals after it has been installed to be sure that it will withstand any pressure that may be encountered during operation of the well.

Prior art packoff seal testers employ a test tool which is lowered by the drill string into position on the upper portion of the inner casing. A seal assembly closes the upper bore of the string of inner casing, and the blowout preventers are then closed around the drill string. Fluid is then introduced under pressure into the wellhead beneath the blowout preventers. The pressure is increased until the differential pressure across the packoff seal reaches the desired test level. Leakage in the packoff seal is detected by monitoring the amount of fluid that must be supplied to maintain the differential pressure across it. If the wellhead is filled with fluid and flow of fluid into the wellhead is terminated, it is assumed that there is no leakage and that the seal is good.

The above technique has the disadvantage that, for it to detect a leak in the packoff seal, fluid must be free to flow across the defective seal at a detectable rate. If the space which is normally beneath the seal being tested is partially filled with cement or mud, a faulty seal may not permit sufficient volume of fluid to leak through for this to be detected by the fluid flow equipment. An additional difficulty with this procedure is that the outer casing normally has a lower bursting rating than the inner casings so that, if the pressure is increased rapidly and the seal is faulty, the possibility exists that the testing procedure will cause the outer casing to burst.

Another prior art packoff seal testing method is disclosed in the U.S. Pat. No. 3,872,713 to Ilfrey et al. In this method a detector assembly having a plurality of feeler arms is inserted into the bore of the inner casing just below the packoff seal. The bore of the inner casing is plugged to prevent pressure in the space above the plug from causing fluid flow down the inner casing. The blowout preventers are then closed to provide an isolated space above the packoff seal, and fluid under pressure is applied to the space immediately above the packoff seal. If any of the fluid leaks through the packoff seal, this fluid produces an inward pressure on the outside of the inner casing causing the dimensions of the inner casing to change slightly, and this slight change in dimensions is then noted by the feeler arms of the detector assembly. One of the disadvantages of this method of detecting a leak in the packoff seal is the fact that there is very little change in the dimensions of the inner casing due to an increase in pressure on the outside of a casing, and these changes may not be readily detectable especially for small leaks in the packoff seal.

SUMMARY OF THE INVENTION

The present invention for detecting leaks in an annular packoff seal in a wellhead includes means for isolating the bore of an inner tubular member from the space directly above the annular seal, and means for applying pressure to the top of the seal so as to provide a pressure differential across the annular seal. A pressure sensitive detector, positioned below the annular seal, indicates any leakage through the seal by detecting any changes in pressure below the seal due to the pressure at the top of the seal.

BRIEF DESCRIPTION OF THE DRAWINGS

FIG. 1 is a diagrammatic side elevation of a subsea well in which the present invention may be used, with portions of the view cut away.

FIG. 2 is a fragmentary diagrammatic central section of a subsea wellhead showing apparatus according to the present invention in position to detect leaks in a packoff seal.

DESCRIPTION OF THE PREFERRED EMBODIMENT

Referring now to the drawings, FIG. 1 discloses an offshore well with a floating platform 10 of the type that is used to produce oil and gas from the well. The platform 10 is supported above the sea surface 11 by a plurality of floats 12, and extending downwardly from the platform 10 is a pipe assembly 14 having a bell nipple assembly 16 connected to the upper end thereof. The pipe assembly 14 includes a riser 18 extending between the platform 10 and a blowout preventer stack 20. The blowout preventer stack 20 is mounted on a wellhead 22 that supports a plurality of casing strings 24 which extend into a borehold 26 drilled into a portion of the sea floor 28. The casing strings 24 are anchored in position by cement 30 which is pumped into the annulus between the borehole 26 and the outermost casing 32.

Details of the cylindrically shaped wellhead 22 are disclosed in the diagrammatic central section of FIG. 2. The lower end of the wellhead 22 is threaded onto the upper end of an outer string of casing 32 which extends downward into a borehole drilled in the ocean floor. The casing string is usually anchored by means of cement which is disposed between the outside of the outer casing and the inside of the borehole.

Disposed about the inner circumference of the bore of the wellhead 22 is an inwardly extending beveled shoulder 34 which serves to support inner strings of casing within the wellhead. A first inner string of casing 36, threaded to a casing hanger 38, is shown positioned concentrically within the outer casing 32. The casing hanger 38 is sized to fit within the bowl of the wellhead, and is beveled at 38a around its lower periphery so as to uniformly engage and be supported by the wellhead's inwardly extending beveled shoulder 34. An annular packoff 40a is positioned between the inner wall 42 of the wellhead and the outer surface 44 of the casing hanger 38. The packoff 40a includes an annular seal ring 45a, composed of a resilient material such as rubber, positioned between a pair of metal rings 46a and 48a. The metal rings 46a and 48a exert pressure on the resilient seal 45a to cause this seal to expand and provide a fluid-tight barrier between the inner surface 42 of the wellhead and the outer surface 44 of the hanger 38.

In a similar manner, a second annular casing hanger 50 is supported on the upper beveled shoulder 39 of the first hanger 38. Connected to the inner bore of the hanger 50 is a second inner string of casing 52 having the upper end thereof threaded into the lower portion of the hanger 50. A second annular packoff 40b, comprising a resilient seal ring 45b and a pair of metal rings 46b and 48b, is positioned between the inner wall 42 of the wellhead 22 and the outer surface 54 of the casing hanger 50. The rings 46b and 48b are mounted on either side of the resilient seal ring 45b. This second packoff provides a fluid barrier between the inner wall of the wellhead 22 and the outer periphery of the second hanger 50.

A third casing hanger 56 is similarly supported on the upper portion of the hanger 50, and employs a third packoff 40c having a pair of metal rings 46c and 48c positioned on either side of a resilient seal ring 45c. A third inner string of casing 57 has the upper end thereof threaded into the lower end of the hanger 56. A quantity of cement 59 is positioned between the inner surface of each of the casings and the outside of the next smaller concentric casing.

Connected to the upper end of the wellhead 22 is the blowout preventer stack 20 of the type which is commonly used in subsea drilling operations. Although the blowout preventer stack normally includes several ram type preventers and a bag type preventer each of which may be used to prevent fluids under pressure, gas, mud, or a combination of these liquids and gases from being forced through the wellhead and up to the surface, only a single blowout preventer 60 is shown in the drawing of the present invention. A section of a drill string 62 is shown extending downward through the inner bore of the blowout preventer stack 20, with the blowout preventer 60 providing an air-tight seal between the inner wall of the blowout preventer stack 20 and the outer periphery of the drill string 62, thus sealing a chamber 64 and preventing fluids and/or gas from escaping upward from this chamber 64.

A generally cylindrically shaped test plug 66 is threaded onto the lower end of the drill string 62 with the lower end of the test plug being adapted to fit into the bore of the uppermost hanger 56. A resilient annular ring 68 is positioned in a groove 70 in the lower portion of the test plug to provide a pressure-tight seal between the plug 66 and the inner wall of the hanger 56, thereby preventing fluid from entering the bore of the inner casing 57 while the upper packoff seal 40c is being tested. A "choke and kill" line 72 is connected to the upper portion of the chamber 64 so that fluid under pressure may be pumped from the surface through this line into the chamber 64 immediately above the upper packoff seal 40c.

A plurality of pressure-sensitive transducers 74–77 are mounted in the sidewalls of the wellhead 22, with the upper transducer 74 being positioned to monitor the pressure within the chamber 64 and each of the other transducers 75–77 being positioned to monitor the pressure in an annular space immediately below one of the packoffs 40a–40c. For example, the pressure-sensitive transducer 75 is positioned to monitor the pressure in the space 78c below the packoff 40c. If the seal 45c of the upper packoff 40c should leak when fluid under pressure is pumped through the line 72 into the chamber 64, fluid forced past the seal 45c will move into the area 78c between the outer periphery of the casing hanger 56, and the inner wall 42 of the wellhead 22. This fluid causes the pressure in the space 78c to increase and causes a change in the signal generated by the transducer 75.

Signals from the pressure-sensitive transducers 74–77 can be carried by a plurality of wires 80–83 to a watertight junction box 85, and from there to the surface by a cable 87 where these signals are monitored to record the pressure in each of the chambers in the wellhead 22. When the wellhead is located a considerable distance below the surface of the water, it may be more convenient to include a sonic transmitter inside the junction box 85 and eliminate the cable 87. Signals may be transmitted from the sonic transmitter and retrieved at the surface of the water.

ASSEMBLY AND TEST PROCEDURE OF THE WELLHEAD AND PACKOFF

After the borehole is drilled in the sea floor, the wellhead 22 is installed by mounting it on the upper end of the string of outer casing 32 which is then lowered into the borehole 26 and cemented into place. A slightly smaller diameter hole is then drilled deeper into the sea floor. The first casing hanger 38 is threaded onto the upper end of the next casing string 36 and lowered onto the bowl of the wellhead so that the hanger 38 is resting on the inwardly extending beveled shoulder 34 of the wellhead 22. A quantity of cement is pumped down the bore of the casing 36, out the bottom end of this casing, upward between the outside of this casing and the inside of the borehole, and finally into the annular space between the outside of this casing 36 and the inside of the outer casing 32. The first packoff seal 40a is then placed in the position shown in FIG. 2 with the resilient seal ring 45a positioned between the metal rings 46a and 48a. The seal ring 45a is tightly squeezed between the inner wall 42 of the wellhead and the outer surface 44 of the hanger 38, thus providing a tight seal between these two surfaces. A test plug 66 is then lowered onto the upper end of the hanger 38 and pushed into position to provide a tight seal between chamber 64 and the upper bore of the casing string 36. The blowout preventer 60 is closed around the drill string 62 to localize the area in which the pressure is increased to test the packoff seal.

A fluid under pressure is then pumped into the chamber 64 through the choke and kill line 72, thereby providing a pressure differential across the packoff seal 45a. The pressure in the chamber 64 is monitored by the pressure-sensitive transducer 74 to record the value of the pressure in this chamber. The transducer 77 monitors the pressure in the annulus 78a between the inner surface of the wall of the wellhead 22 and the outer surface of the casing string 36. If there is no leak in the packoff seal 45a the pressure in the annular space 78a will be relatively low to indicate a good seal. If, however, there is a leak in the packoff seal 45a the pressure in the space 78a will rise, causing the transducer 77 to provide a signal which indicates the value of this pressure. Should a pressure rise be encountered, the packoff seal 45a is either replaced or adjusted.

The second hanger 50 is then threaded onto the upper end of the next inner string of casing 52 and positioned as shown on the upper end of the first hanger 38. Cement is pumped into the space between the outside of casing 52 and the inside of casing 36, and the packoff 40b is installed. The test plug 66 is lowered into the upper end of the casing hanger 50. Fluid is again pumped into the chamber 64 to test the integrity of the packoff 40b. Any leakage through the packoff 40b is detected by the pressure-sensitive transducer 76.

The third hanger 56 is threaded onto the upper end of the innermost string of casing 57 and lowered into the position shown with the hanger 56 resting on the upper portion of the hanger 50. Cement is pumped into the space between the outside of the casing 57 and the inside of the casing 52, and the packoff 40c is then placed in the position shown in FIG. 2. The test plug 66 is installed in the position shown in FIG. 2, and fluid under pressure is again pumped into the chamber 64. Any leak in the packoff 40c is accompanied by a rise in pressure in the area 78c, and such an increase in pressure is monitored by the pressure-sensitive transducer 75.

The present invention provides a simple means for testing the seals of each of the packoffs in a remotely located wellhead. The cement is pumped into the spaces between the various concentric casings in the usual manner, and the blowout preventer is used in the conventional manner, thereby avoiding all but a relatively minor change in operating procedures. The pressure-sensitive transducers can be positioned in the wall of the wellhead and each of the packoffs checked as they are set into place.

Although the best mode contemplated for carrying out the present invention has been herein shown and described, it will be apparent that modification and variation may be made without departing from what is regarded to be the subject matter of the invention.

What is claimed is:

1. Apparatus for detecting a leak in an annular seal disposed between the exterior of an inner tubular member and a wellhead from which the inner tubular member is suspended, said apparatus comprising:

means for isolating the bore of said inner tubular member from the space directly above said annular seal;

means for applying pressure to the top of said annular seal to provide a pressure differential across said annular seal;

first and second pressure-sensitive transducers;

means for connecting said first pressure-sensitive transducer to a chamber below said annular seal to detect changes in pressure below said seal in response to leakage therethrough due to the pressure differential across said seal; and means for connecting said second pressure-sensitive transducer in said space above said annular seal to monitor the pressure applied above said annular seal.

2. Apparatus for detecting a leak as defined in claim 1, wherein said means for applying pressure includes means for isolating said space above said annular seal so that said space above said seal can be pressurized.

3. Apparatus for detecting a leak as defined in claim 1, including means for isolating the space below said annular seal thereby causing the pressure below said annular seal to increase as a result of any leakage through said seal.

4. Apparatus for detecting a leak as defined in claim 1, including a second pressure-sensitive transducer, and means for connecting said second pressure-sensitive transducer to said space above said annular seal to monitor the pressure above said seal.

5. Apparatus for detecting a leak as defined in claim 1, including means for transmitting signals from said pressure-sensitive transducer to a location where said signals can be monitored.

6. Apparatus for detecting a leak in an annular seal disposed between the exterior of an inner tubular member and a wellhead from which the inner tubular member is suspended, said apparatus comprising:

means for isolating the bore of said inner tubular member from the space directly above said annular seal;

means for applying fluid under pressure to the top of said annular seal to provide a pressure differential across said annular seal;

first and second pressure-sensitive transducers;

means for mounting said first pressure-sensitive transducer in the wall of said wellhead below said annular seal, said first pressure transducer monitoring the pressure in a space between the exterior of said inner tubular member and the interior of said wellhead; and means for mounting said second pressure-sensitive transducer in the wall of said wellhead above said annular seal to monitor the pressure applied above said annular seal.

7. Apparatus for detecting a leak as defined in claim 5, including means for isolating said space above said annular seal so that said space above said seal can be pressurized, and means for conducting fluid under pressure to the space above said annular seal.

8. Apparatus for detecting a leak as defined in claim 5, including means for isolating said space between the exterior of said inner tubular member and the interior of said outer tubular member, thereby causing the pressure below said annular seal to rise as a result of leakage through said seal.

9. In a wellhead having an outer casing and a plurality of strings of inner casings with an annular seal positioned between each of said inner casings and said outer casing, means for testing for leaks in each of said annular seals comprising:

means for isolating the bore of said inner casings from the space directly above said annular seals;

means for applying fluid under pressure to the top of the annular seal being tested;

a plurality of pressure-sensitive transducers,
means for mounting one of said pressure-sensitive transducers in said space above said seals; and
means for mounting each of the other pressure-sensitive transducers in the wall of said wellhead below the corresponding annular seal which the transducer is to test.

* * * * *